US011701986B2

(12) United States Patent
Feng

(10) Patent No.: US 11,701,986 B2
(45) Date of Patent: Jul. 18, 2023

(54) ROTATION DEVICE FOR VEHICLE SEAT

(71) Applicant: YANFENG INTERNATIONAL SEATING SYSTEMS CO., LTD., Shanghai (CN)

(72) Inventor: Qingwei Feng, Shanghai (CN)

(73) Assignee: YANFENG INTERNATIONAL SEATING SYSTEMS CO., LTD., Shanghai (CN)

(*) Notice: Subject to any disclaimer, the term of this patent is extended or adjusted under 35 U.S.C. 154(b) by 14 days.

(21) Appl. No.: 17/310,630

(22) PCT Filed: Dec. 31, 2019

(86) PCT No.: PCT/CN2019/130592
§ 371 (c)(1),
(2) Date: Aug. 13, 2021

(87) PCT Pub. No.: WO2020/164326
PCT Pub. Date: Aug. 20, 2020

(65) Prior Publication Data
US 2022/0203869 A1 Jun. 30, 2022

(30) Foreign Application Priority Data
Feb. 14, 2019 (CN) .......................... 201910114771.6

(51) Int. Cl.
B60N 2/14 (2006.01)
B60N 2/02 (2006.01)

(52) U.S. Cl.
CPC ............. B60N 2/14 (2013.01); B60N 2/0232 (2013.01)

(58) Field of Classification Search
CPC ........ B60N 2/14; B60N 2/0232; B60N 2/067; B60N 2002/0216; B60N 2002/0212; B60N 2002/022
(Continued)

(56) References Cited

U.S. PATENT DOCUMENTS 5,110,181 A * 5/1992 Simjian .................... A47C 1/11
297/344.21
5,292,179 A * 3/1994 Forget ..................... B60N 2/20
248/425
(Continued)

FOREIGN PATENT DOCUMENTS

CN 1080214 C 3/2002
CN 105682981 A 6/2016
(Continued)

OTHER PUBLICATIONS

"International Application No. PCT/CN2019/130592, International Search Report and Written Opinion dated Mar. 27, 2020", (Mar. 27, 2020), 10 pgs.
(Continued)

Primary Examiner — Mark R Wendell
(74) Attorney, Agent, or Firm — Schwegman Lundberg & Woessner, P.A.

(57) ABSTRACT

The present invention discloses a rotation device for a vehicle seat. The device includes a fixed disc, a lower ball assembly, a movable disc, an upper ball assembly, and a platen successively arranged from bottom to top. A first lower circular track is formed on the fixed disc. A first upper circular track and a second lower circular track are formed on the movable disc. A second upper circular track is formed on the platen. A diameter of a first arcuate envelope line of the first lower circular track that is in contact with a lower ball and a diameter of a second arcuate envelope line of the first upper circular track that is in contact with the lower ball are both equal to a diameter of the lower ball, and a height of the first arcuate envelope line and a height of the second arcuate envelope line are 0.8 times the diameter of the lower ball. A diameter of a third arcuate envelope line of the second lower circular track that is in contact with an upper ball and a diameter of a fourth arcuate envelope line of the (Continued)

second upper circular track that is in contact with the upper ball are both equal to a diameter of the upper ball, and a height of the third arcuate envelope line and a height of the fourth arcuate envelope line are both 0.8 times the diameter of the upper ball. By means of the present invention, a smooth rotary operating force can be achieved, and a service life of the rotation device can be properly prolonged.

21 Claims, 5 Drawing Sheets

(58) Field of Classification Search
USPC .......................................................... 297/344.2
See application file for complete search history.

(56) References Cited

U.S. PATENT DOCUMENTS

| | | | | |
|---|---|---|---|---|
| 5,318,339 | A * | 6/1994 | Cherniak | B60N 2/245 |
| | | | | 297/250.1 |
| 5,779,309 | A * | 7/1998 | Lu | A47C 3/18 |
| | | | | 297/344.26 |
| 5,810,441 | A * | 9/1998 | Ezuka | B60N 2/143 |
| | | | | 297/344.22 |
| 6,015,188 | A | 1/2000 | Yundt et al. | |
| 6,021,989 | A * | 2/2000 | Morita | B60N 2/143 |
| | | | | 297/344.26 |
| 6,575,420 | B2 * | 6/2003 | Yoshida | B60N 2/14 |
| | | | | 297/344.22 |
| 9,211,812 | B2 * | 12/2015 | Haller | B60N 2/508 |
| 9,579,995 | B2 * | 2/2017 | Haller | B60N 2/16 |
| 9,815,390 | B2 | 11/2017 | Adam | |
| 11,407,336 | B2 * | 8/2022 | Tibbits | F16C 19/10 |
| 2008/0211284 | A1 * | 9/2008 | Mutou | B60N 2/146 |
| | | | | 297/354.1 |
| 2011/0163586 | A1 * | 7/2011 | Findlay | A47C 1/0265 |
| | | | | 384/477 |
| 2014/0217796 | A1 * | 8/2014 | Haller | B60N 2/146 |
| | | | | 297/344.26 |
| 2016/0229314 | A1 | 8/2016 | Adam | |
| 2019/0160977 | A1 * | 5/2019 | Feng | B60N 2/42736 |

FOREIGN PATENT DOCUMENTS

| | | |
|---|---|---|
| CN | 106427682 A | 2/2017 |
| CN | 107953806 A | 4/2018 |
| CN | 108528280 A | 9/2018 |
| CN | 109677302 A | 4/2019 |
| CN | 108556691 B | 9/2020 |
| JP | 2003063288 A | 3/2003 |
| JP | 2005009521 A | 1/2005 |
| WO | WO-2020164326 A1 | 8/2020 |

OTHER PUBLICATIONS

"Chinese Application No. 201910114771.6, First Office Action dated Dec. 3, 2019", (Dec. 3, 2019), 7 pgs.

"Chinese Application No. 201910114771.6, First Search dated Nov. 26, 2019", (Nov. 26, 2019), 1 pg.

"Chinese Application No. 201910114771.6, Notification to Grant Patent Right for Invention dated Jul. 28, 2020", (Jul. 28, 2020), 2 pgs.

* cited by examiner

ROTATION DEVICE FOR VEHICLE SEAT

PRIORITY CLAIM TO RELATED APPLICATIONS

This application is a U.S. national stage filing under 35 U.S.C. § 371 from International Application No. PCT/CN2019/130592, filed on 31 Dec. 2019, and published as WO2020/164326 on 20 Aug. 2020, which claims the benefit under 35 U.S.C. 119 to Chinese Application No. 201910114771.6, filed on 14 Feb. 2019, the benefit of priority of each of which is claimed herein, and which applications and publication are hereby incorporated herein by reference in their entirety.

TECHNICAL FIELD

The present invention relates to the technical field of vehicle seats, and in particular, to a rotation device for a vehicle seat.

BACKGROUND

Existing rotation devices for an automobile seat to rotate about a vertical axis are classified into rolling rotation devices and sliding rotation devices according to a rotation medium. In the rolling rotation mechanism, a plurality of hard balls are pre-disposed in a holder as the rotation medium to cause a movable disc to rotate in an annular track formed by upper and lower row of balls. In order to enhance anti-separation strength, an upper mousing hook is mounted to the movable disc, and a lower mousing hook is mounted to a fixed disc. Under the action of a force, the upper mousing hook and the lower mousing hook may be hooked to each other to enhance the anti-separation effect of the rotation device.

The foregoing technical solutions are well-known technologies in the art, and reference may be made to Chinese inventive patents CN106427682A, CN97114364.1, and CN10793806A.

However, the prior art has the following problems:

(1) When a seat is locked, under the action of a high dynamic impact stress, for example, when a vehicle is in violent motions, an upper ball and a lower ball of the rotation device may repeatedly roll over an annular track at the same point in a radial direction. Since the hard balls act on a soft stamping sheet, indentations or other damages may be caused to a surface of the annular track in case of no control for the radial rolling-over effect. When the hard balls roll to the indentations, an obvious abrupt feeling is usually generated, bringing poor usage experience to users. In addition, a service life of the whole rotation device is also obviously affected. This is quite common in a middle row of independent seats in MPVs, because these seats need to bear a higher pressure.

(2) When a rotation portion of the rotation device uses hard balls as the rotation medium, upper steel balls and lower steel balls are prone to crushing during tightening of a compression bolt according to a standard torque.

(3) As a stress terminal in case of a vehicle collision, the rotation device is required to remain normal to protect a passenger from injury. The rotation device is required to have higher strength especially when three safety belt fixing points are all mounted to a seat. In various currently known technical solutions for rotating vehicle seats such as Chinese Patent Application No. CN108528280A, a motor is mounted to a rotary disc to drive a core recliner, so as to complete rotation and stop of the rotation device by virtue of a self-locking characteristic of the core recliner. However, since the core recliner has a relatively small diameter, the core recliner cannot bear a relatively large radial (Y) load, failing to satisfy strength requirements for the three-point safety belt seat.

(4) In order to guarantee strength, existing rotation devices have a relatively large weight, failing to satisfy a lightweight requirement for vehicles.

SUMMARY

In view of running abruptness of an existing rotation device as a result of an indentation on an annular track caused by hard balls, a first technical problem to be resolved in the present invention is to provide a rotation device for a vehicle seat which has a smooth rotary operating force and has a proper longer service life.

Since an existing rotation device uses hard balls as a rotation medium, upper steel balls and lower steel balls are prone to crushing during tightening of a compression bolt according to a standard torque. Therefore, a second technical problem to be resolved in the present invention is to provide a rotation device for a vehicle seat which has a smooth rotary operating force and having a rotation damping value that may be properly adjusted.

In view of a failure of an existing rotation device to satisfy a strength requirement for a three-point safety belt seat and a lightweight requirement, a third technical problem to be resolved in the present invention is to provide a rotation device for a vehicle seat having high strength and a light weight.

The technical problem to be solved by the present invention may be implemented by the following technical solutions.

A rotation device for a vehicle seat includes a fixed disc, a lower ball assembly, a movable disc, an upper ball assembly, and a platen successively arranged from bottom to top. The fixed disc is connected to the platen by using a plurality of fastening structures. A first lower circular track is formed on the fixed disc by means of mould pressing. A first upper circular track and a second lower circular track are formed on the movable disc by means of mould pressing. A second upper circular track is formed on the platen by means of mould pressing. The upper ball assembly includes a plurality of upper balls configured for rolling contact with the second upper circular track and the second lower circular track and an upper holder configured to hold the upper balls between the pressing disc and the movable disc. The lower ball assembly includes a plurality of lower balls configured for rolling contact with the first upper circular track and the first lower circular track and a low holder configured to hold the lower balls between the movable disc and the fixed disc. An upper mousing hook is fixed to the fixed disc. A lower mousing hook is formed on a periphery of the movable disc. The upper mousing hook and the lower mousing hook are hooked to each other to avoid disengagement of the movable disc. A diameter of a first arcuate envelope line of the first lower circular track that is in contact with each of the lower balls and a diameter of a second arcuate envelope line of the first upper circular track that is in contact with the lower ball are both equal to a diameter of the lower ball, a height of the first arcuate envelope line and a height of the second arcuate envelope line are both 0.8 times the diameter of the lower ball, a diameter of a third arcuate envelope line of the second lower circular track that is in contact with each of the upper balls and a diameter of a fourth arcuate envelope line of the second upper circular track that is in contact with the upper ball are both equal to a diameter of the upper ball, and a height of the third arcuate envelope line and a height of the fourth arcuate envelope line are both 0.8 times the diameter of the upper ball.

In an exemplary embodiment of the present invention, the diameter of the upper ball and the diameter of the lower ball are both 10 mm.

In an exemplary embodiment of the present invention, the first upper circular track and the second lower circular track are connected in a wave form in a radial direction.

In an exemplary embodiment of the present invention, the diameter of the upper ball is equal to the diameter of the lower ball, and a distance between a circle center-passing plumb line of the upper ball and a circle center-passing plumb line of the lower ball is equal to the diameter of the upper steel ball or the lower steel ball.

In an exemplary embodiment of the present invention, in order to prevent the pressing disc from crushing the upper ball and the lower ball and to properly adjust a damper during rotation, a spacer is disposed between the pressing disc and the fixed disc, and the fastening structures pass through the spacer. A plurality of bosses are uniformly distributed on a face in a circumferential direction of the spacer that is in contact with the platen. The bosses are configured to reduce a friction on the movable disc when clamped by the fixed disc and the platen.

In an exemplary embodiment of the present invention, a height of each of the bosses is 0.2-0.4 mm A higher boss brings a more obvious friction reducing effect for the movable disc.

In an exemplary embodiment of the present invention, the spacer is annular.

In an exemplary embodiment of the present invention, the spacer is composed of at least two arcuate spacers. In a case that a mounting sequence and a screwing force of the fastening structures are constant, the arcuate spacers are assembled in groups according to a tolerance zone between the platen and the fixed disc, so as to obtain a rotation device having different rotation damping values.

In an exemplary embodiment of the present invention, a thickness of the spacer is 1 mm.

In an exemplary embodiment of the present invention, the plurality of fastening structures are uniformly distributed in a circumferential direction to fixedly connect an inner edge of the platen to an inner edge of the fixed disc.

In an exemplary embodiment of the present invention, each of the fastening structures includes a through hole formed on the inner edge of the platen, a threaded hole formed on the inner edge of the fixed disc, and a bolt configured to pass through the through hole to be screwed into the threaded hole. The threaded hole is directly formed on the inner edge of the fixed disc, so that a spot-welding nut is omitted, and a weight of a transmission device and costs are reduced.

In an exemplary embodiment of the present invention, a plurality of upper mousing hook connecting bolts are fixed to an outer periphery of the upper mousing hook at intervals in a circumferential direction, and a plurality of upper mousing hook connecting bolt passing holes are provided on an outer periphery of the fixed disc at intervals in a circumferential direction. Each of the upper mousing hook connecting bolts passes through the corresponding upper mousing hook connecting bolt passing hole to be screwed into an upper mousing hook connecting nut, so as to tightly connect the upper mousing hook to the fixed disc.

In an exemplary embodiment of the present invention, the upper mousing hook connecting bolt is fixed to the outer periphery of the upper mousing hook by means of spot welding.

In an exemplary embodiment of the present invention, a plurality of lower rotation device connecting bolts are fixed to an outer periphery of the upper mousing hook at intervals in a circumferential direction, and a plurality of rotation device connecting bolt passing holes are provided on an outer periphery of the fixed disc at intervals in a circumferential direction. Each of the lower rotation device connecting bolts passes through the corresponding rotation device connecting bolt passing hole to be connected to a vehicle floor or a base, thereby fixing the rotation device for a vehicle seat of the present invention to the vehicle floor or the base.

In an exemplary embodiment of the present invention, a plurality of stepped nuts each having a T-shaped axial cross section are fixed to the movable disc at intervals in a circumferential direction. A nut head of each of the stepped nuts is located under the movable disc and tightly attached to a bottom face of the movable disc. A nut portion of the stepped nut extends upward out of the movable disc. A bolt on the seat is connected to the nut portion of the corresponding stepped nut to mount and fixedly connect the seat to the movable disc. By disposing the stepped nut on the movable disc, anti-separation performance between the seat and movable disc can be enhanced.

In an exemplary embodiment of the present invention, the nut head of the stepped nut is rectangular, to increase a contact area between the nut head and the bottom face of the movable disc, thereby greatly enhancing connection strength between the stepped nuts and the movable disc.

In an exemplary embodiment of the present invention, the nut head of the stepped nut is fixed to the movable disc by means of welding.

In an exemplary embodiment of the present invention, in order to connect the movable disc to other modules, module connecting bolts are fixed to the movable disc at intervals in a circumferential direction according to position requirements for mounting the other modules. A bolt head of each of the module connecting bolts is located under the movable disc and tightly attached to a bottom face of the movable disc, and a screw portion of the module connecting bolt extends upward out of the movable disc.

In an exemplary embodiment of the present invention, the module connecting bolt is fixedly connected to the movable disc by means of spot welding.

In an exemplary embodiment of the present invention, a plurality of inner weight-reducing grooves are accurately cut out on an inner edge of the platen at intervals in a circumferential direction and on an inner edge of the fixed disc in a circumferential direction, and a plurality of outer weight-reducing grooves are accurately cut out on an outer edge of the fixed disc at intervals in a circumferential direction.

In an exemplary embodiment of the present invention, a depth of each of the inner weight-reducing grooves and a depth of each of the outer weight-reducing grooves are both 17 mm.

By means of the foregoing technical solutions, centers of sphere of the upper ball and the lower ball of the present invention are always unable to move relative to centers of cross sections of the respective tracks. In case of a radial force transmitted from the seat, the upper ball and the lower ball enveloped by the upper track and the lower track directly support each other, thereby producing a very stable structural unit. In conclusion, by means of the design of enveloping the upper ball and the lower ball by the upper track and the lower track of the present invention, it is possible that the movable disc always maintains zero movement relative to the fixed disc when receiving a radial (Y) force, even though the force received in the radial direction is from the seat mounted to the rotation device. In this case, a rotary shaft of the rotation device can coincide with an axis perpendicular to a geometric center about which the seat is rotated. Therefore, in the present invention, the movable disc cannot be moved up and down or in a horizontal direction in any case, resolving a problem such as rolling-over of the track caused by the radial movement of the balls. In this way, a rotary operating force of the movable disc is smoother and a service life and rotation accuracy are improved.

DETAILED DESCRIPTION

The following describes the present invention in detail with reference to the accompanying drawings and specific implementations.

Figure 1:
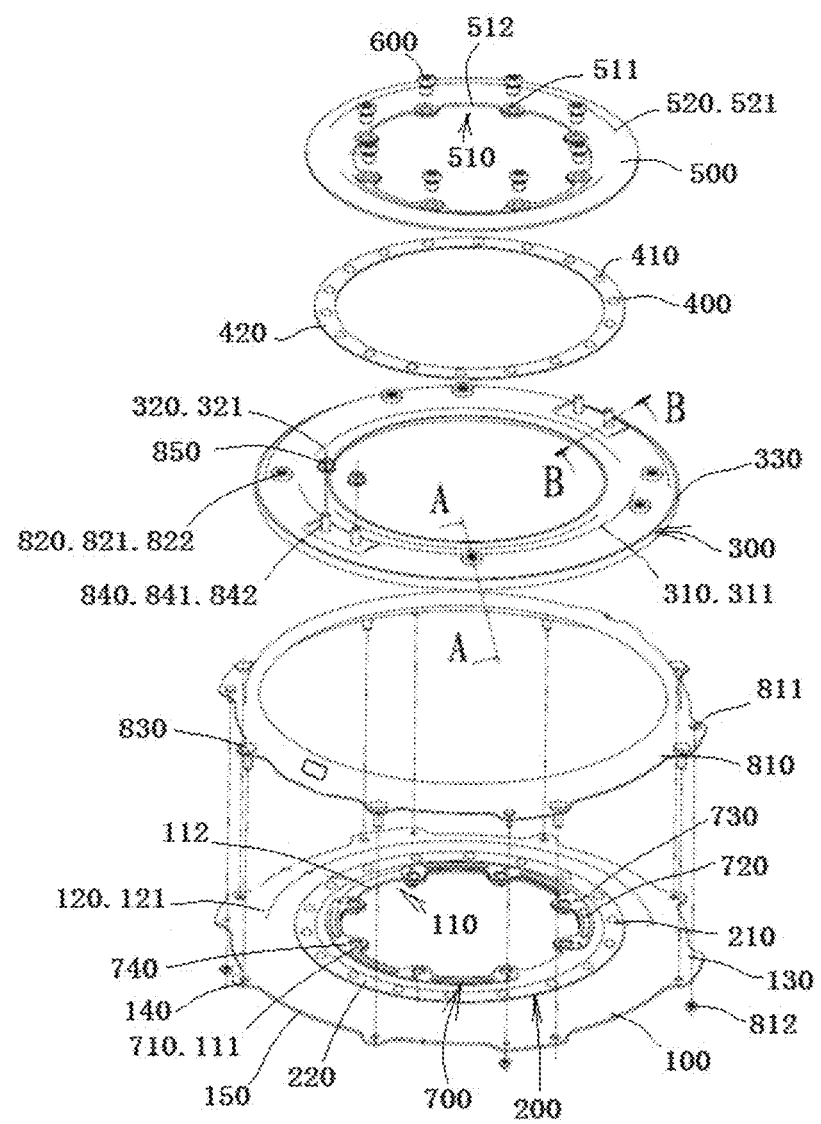
FIG. 1 is a schematic exploded view of a rotation device for a vehicle seat according to the present invention.
Figure 2:
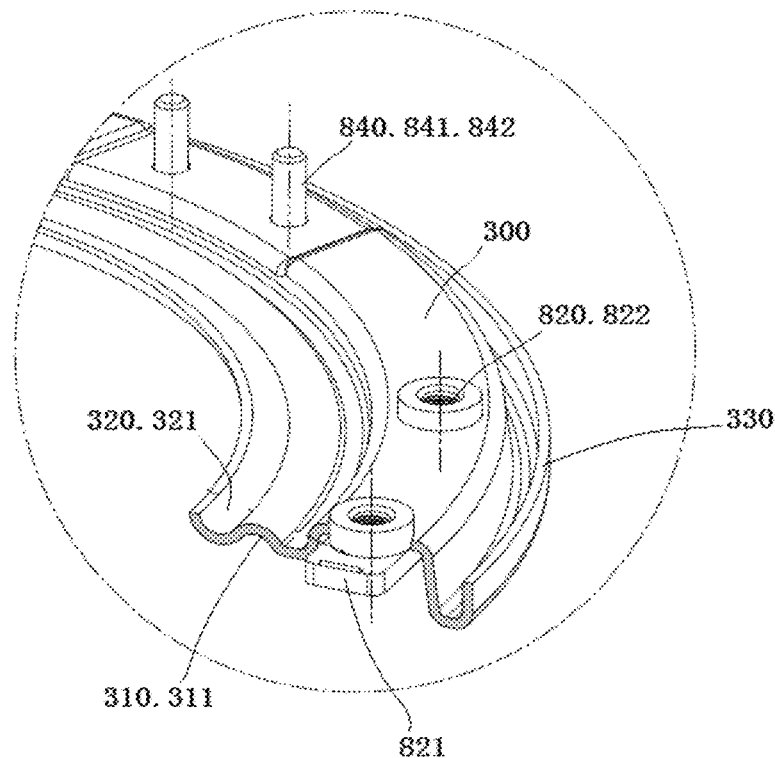
FIG. 2 is a cross-sectional view along A-A of FIG. 1.
Figure 3:
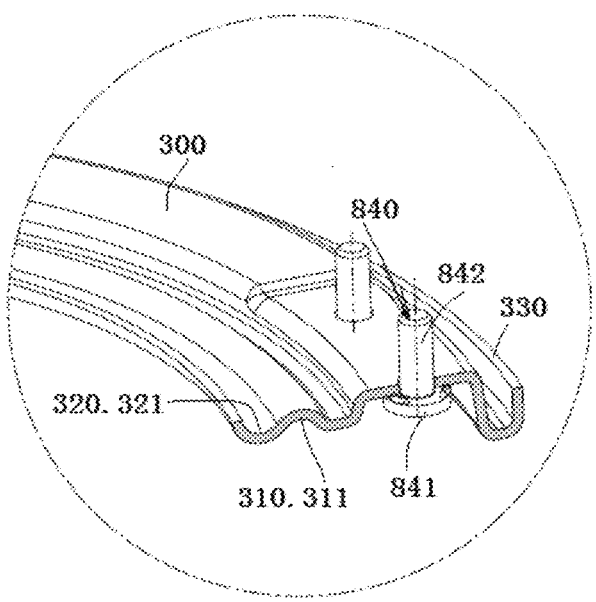
FIG. 3 is a cross-sectional view along B-B of FIG. 1.
Figure 4:
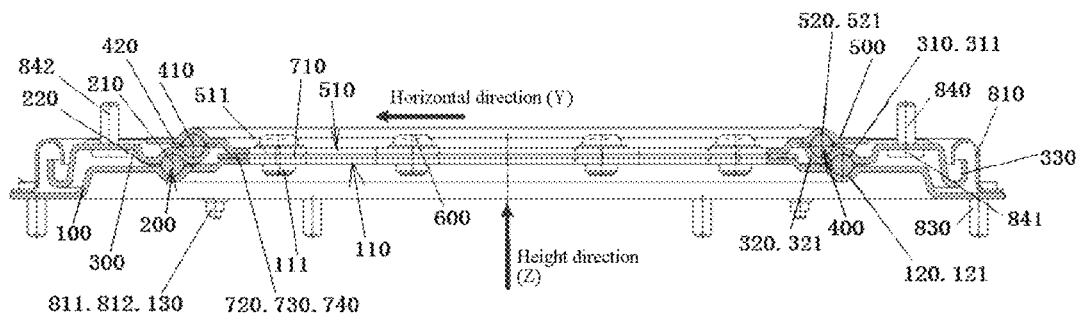
FIG. 4 is a structural cross-sectional view of the rotation device for a vehicle seat according to the present invention.
Figure 5:
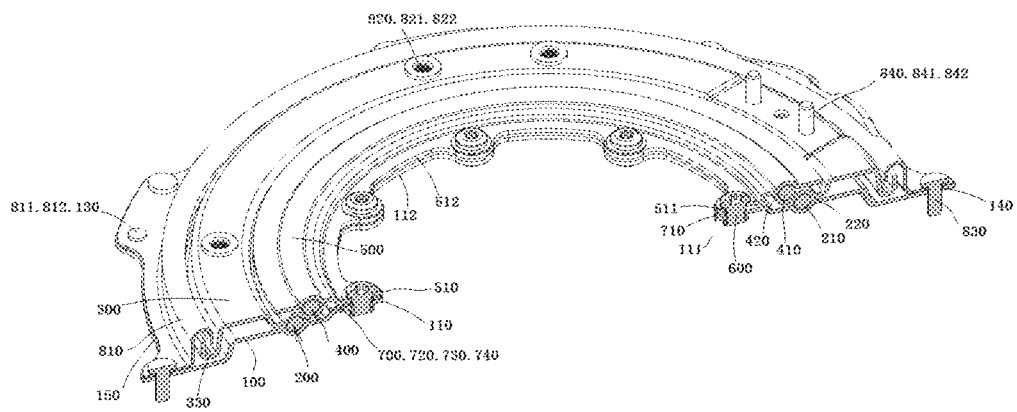
FIG. 5 is a three-dimensional structural cross-sectional view of the rotation device for a vehicle seat according to the present invention.
Figure 6:
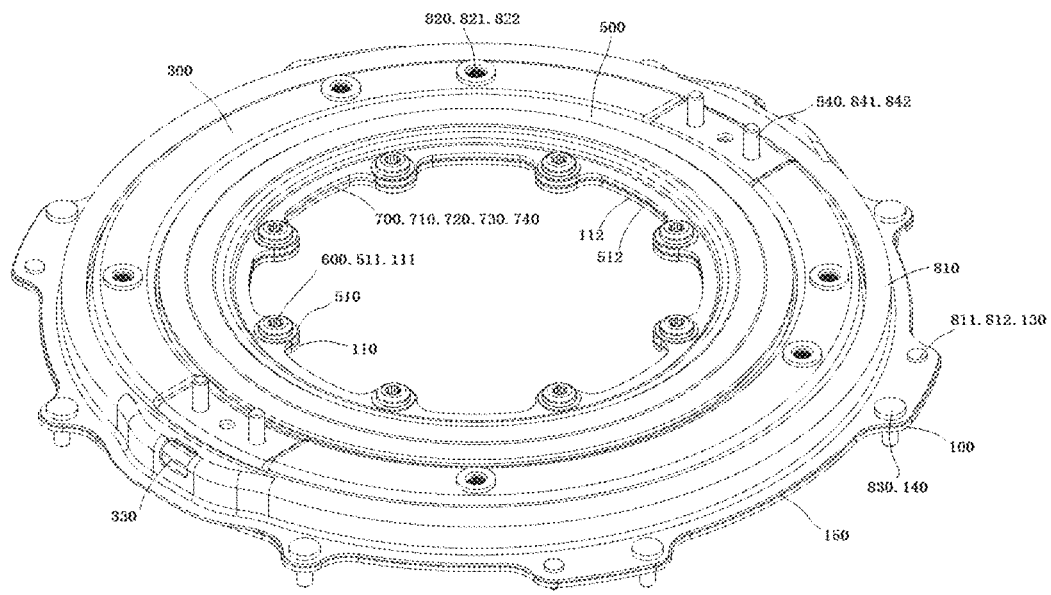
FIG. 6 is a three-dimensional schematic structural diagram of the rotation device for a vehicle seat according to the present invention.
Figure 7:
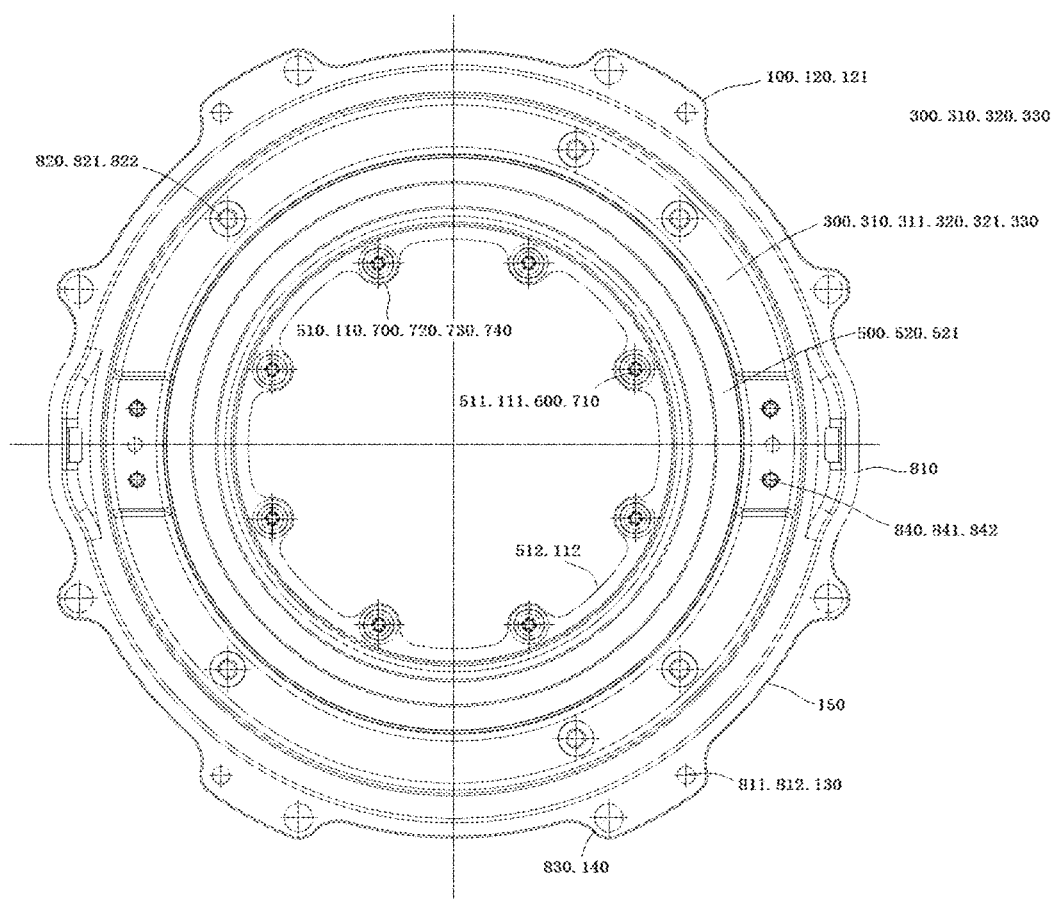
FIG. 7 is a top view of the rotation device for a vehicle seat according to the present invention.
Figure 8:
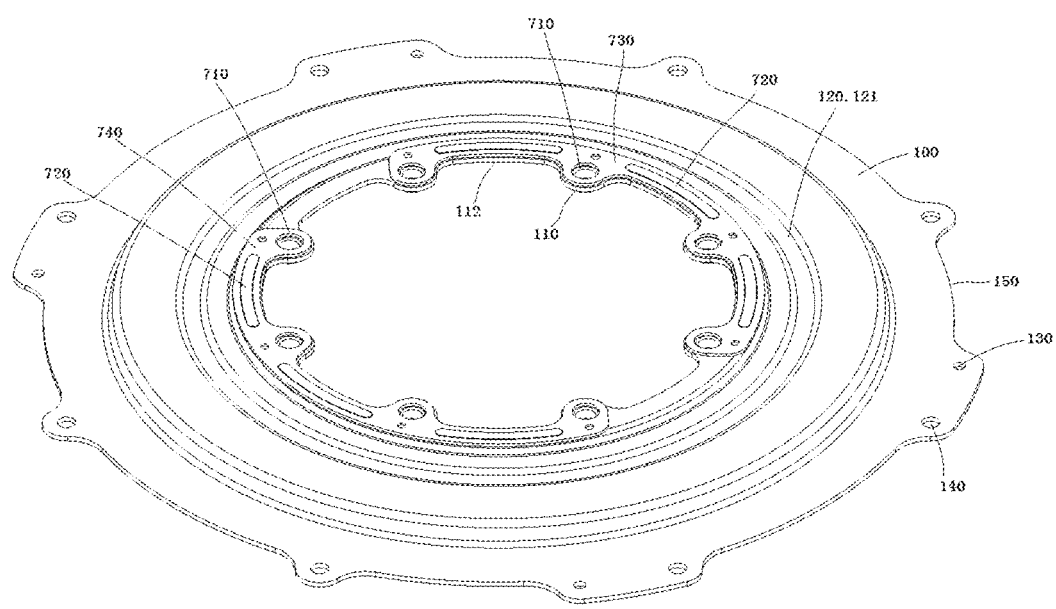
FIG. 8 is a schematic assembly diagram of an arcuate spacer of the rotation device for a vehicle seat according to the present invention.

Referring to FIG. 1 to FIG. 8, a rotation device for a vehicle seat shown in the figures includes a fixed disc 100, a lower ball assembly 200, a movable disc 300, an upper ball assembly 400, and a platen 500 successively arranged from bottom to top.

The fixed disc 100 is connected to the platen 500 by using eight fastening structures. In particular, the eight fastening structures are uniformly distributed in a circumferential direction to fixedly connect an inner edge 510 of the platen 500 to an inner edge 110 of the fixed disc 100.

Each of the fastening structures includes a through hole 511 formed on the inner edge 510 of the platen 500, a threaded hole 111 formed on the inner edge 110 of the fixed disc 100, and a bolt 600 configured to pass through the through hole 511 to be screwed into the threaded hole 111. In the present invention, since the threaded hole 111 is directly formed on the inner edge 110 of the fixed disc 100, a spot-welding nut is omitted, and a weight of a transmission device and costs are reduced.

A first lower circular track 120 is formed on the fixed disc 100 by means of mould compression, a first upper circular track 310 and a second lower circular track 320 are formed on the movable disc 300 by means of mould compression, and a second upper circular track 520 is formed on the platen 500 by means of mould compression. The first upper circular track 310 and the second lower circular track 320 are connected in a wave form in a radial direction.

The upper ball assembly 400 includes 18 upper balls 410 configured for rolling contact with the second upper circular track 520 and the second lower circular track 320 and an upper holder 420 configured to hold the 18 upper balls 410 between the platen 500 and the movable disc 300.

The lower ball assembly 200 includes 18 lower balls 210 configured for rolling contact with the first upper circular track 310 and the first lower circular track 120 and a low holder 220 configured to hold the 18 lower balls 210 between the movable disc 300 and the fixed disc 100.

A diameter of each of the 18 upper balls 410 and a diameter of each of the 18 lower balls 210 are the same, which are 10 mm. The 18 upper balls 410 and the 18 lower balls 210 are all steel balls.

A diameter of an arcuate envelope line 121 of the first lower circular track 120 that is in contact with the lower ball 210 and a diameter of an arcuate envelope line 311 of the first upper circular track 310 that is in contact with the lower ball 210 are both equal to the diameter of the lower ball 210, and respective heights are both 0.8 times the diameter of the lower ball 210.

A diameter of an arcuate envelope line 321 of the second lower circular track 320 that is in contact with the upper ball 410 and a diameter of an arcuate envelope line 521 of the second upper circular track 520 that is in contact with the upper ball 410 are both equal to the diameter of the upper ball 410, and respective heights are both 0.8 times the diameter of the upper ball 410.

A distance between a circle center-passing plumb line of the upper ball 410 and a circle center-passing plumb line of the lower ball 210 is 10 mm.

Centers of sphere of the upper ball 410 and the lower ball 210 of the present invention are always unable to move relative to centers of cross sections of the respective tracks. In case of a radial force transmitted from the seat, the upper ball and the lower ball enveloped by the upper track and the lower track directly support each other, thereby producing a very stable structural unit. By means of the design of enveloping the upper ball 410 and the lower ball 210 by the upper track and the lower track of the present invention, it is possible that the movable disc 300 always maintains zero movement relative to the fixed disc 100 when receiving a radial (Y) force, even though the force received in the radial direction is from the seat mounted to the rotation device. In this case, a rotary shaft of the rotation device can coincide with an axis perpendicular to a geometric center about which the seat is rotated. Therefore, in the present invention, the movable disc 300 cannot be moved up and down or in a horizontal direction in any case, resolving a problem such as rolling-over of the track caused by the radial movement of the balls. In this way, a rotary operating force of the movable disc is smoother and a service life and rotation accuracy are improved.

In order to prevent the platen 500 from crushing the upper ball 410 and lower ball 210 and to properly adjust a damper during rotation, a spacer 700 is disposed between the platen 500 and the fixed disc 100. Eight through holes 710 are further provided on the spacer 700. The bolt 600 passes through the corresponding through hole 710. A thickness of the spacer 700 is 1 mm.

A plurality of bosses 720 are uniformly distributed in a circumferential direction on a face of the spacer 700 that is in contact with the platen 500. The bosses 720 are configured to reduce a friction on the movable disc 300 when clamped by the fixed disc 100 and the platen 500. The height of each of the bosses 720 is 0.2-0.4 mm A higher boss brings a more obvious friction reducing effect for the movable disc.

The spacer 700 of the present invention is annular and may be composed of two arcuate spacers 730 and 740. Four through holes 710 are provided on each of the arcuate spacers 730 and 740. In a case that a mounting sequence and a screwing force of the eight bolts 600 are constant, the two arcuate spacers 730 and 740 are assembled in groups according to a tolerance zone between the platen 500 and the fixed disc 100, so as to obtain a rotation device having different rotation damping values.

In order to avoid disengagement of the movable disc 300, an upper mousing hook 810 is fixed to an outer periphery of the fixed disc 100. The upper mousing hook 810 is in an annular shape in a circumferential direction and is in an inverted J shape in an axial direction. A lower mousing hook 330 is formed on an outer periphery of the movable disc 300 by means of mould compression. The lower mousing hook 330 is in an annular shape in a circumferential direction and is in a J shape in an axial direction. The upper mousing hook 810 and the lower mousing hook 330 are hooked to each other to enhance the anti-separation strength between the movable disc 300 and the fixed disc 100. In this way, the movable disc can bear a force more than 20000 N without disengagement. In such a manner of anti-separation between the movable disc 300 and the fixed disc 100, parts and processes are reduced, a cross section has a lower height, and an occupied space is smaller, compared with the prior art.

The upper mousing hook 810 is fixed to the outer periphery of the fixed disc 100 by using 4 mousing hook connecting bolts 811 and four mousing hook connecting nuts 812.

The 4 mousing hook connecting bolts 811 are fixed to an outer periphery of the upper mousing hook 810 by means of spot welding, and a plurality of upper mousing hook connecting bolt passing holes 130 are provided on the outer periphery of the fixed disc 100 at intervals in a circumferential direction. Each of the upper mousing hook connecting bolts 811 passes through the corresponding upper mousing hook connecting bolt passing hole 130 to be screwed into an upper mousing hook connecting nut 812, so as to tightly connect the upper mousing hook 810 to the fixed disc 100.

As the anti-separation strength between the movable disc 300 and the fixed disc 100 is increased, anti-separation performance at a position at which the movable disc 300 is connected to the seat also needs to be enhanced. Therefore, in the present invention, six stepped nuts 820 each having a T-shaped axial cross section are fixed to the movable disc 300 at intervals in a circumferential direction.

A nut head 821 of each of the stepped nuts 820 is rectangular, is located under the movable disc 300, is tightly attached to a bottom face of the movable disc 300, and is fixed to the movable disc 300 by means of welding, so as to increase a contact area between the nut head 821 and the bottom face of the movable disc 300, thereby greatly enhancing connection strength between the stepped nut 820 and the movable disc 300. A nut portion 822 of the stepped nut 820 extends upward out of the movable disc 300. A bolt on the seat is connected to the nut portion 822 of the corresponding stepped nut 820 to mount and fixedly connect the seat to the movable disc 300.

In order to connect the rotation device of the present invention to the base or the vehicle floor, eight lower rotation device connecting bolts 830 are fixed to the outer periphery of the upper mousing hook 810 at intervals in the circumferential direction, and eight rotation device connecting bolt passing holes 140 are provided on the outer periphery of the fixed disc 100 at intervals in the circumferential direction. Each of the lower rotation device connecting bolts 830 passes through the corresponding rotation device connecting bolt passing hole 140 to be connected to the vehicle floor or the base.

In order to connect the movable disc to other modules, four module connecting bolts 840 are fixed to the movable disc 300 at intervals in a circumferential direction according to position requirements for mounting the other modules. A bolt head 841 of each of the module connecting bolts 840 is located under the movable disc 300 and tightly attached to the bottom face of the movable disc 300. The module connecting bolt 840 and the movable plate 300 are fixedly connected by means of spot welding. A screw portion 842 of the module connecting bolt 840 extends upward out of the movable disc 300. The other modules are fastened by using nuts 850 after being mounted to the module connecting bolt 840.

In order to not only achieve lightweight of products but also maintain strength performance, in the present invention, eight inner weight-reducing grooves 512 and 112 are accurately cut out on the inner edge 510 of the platen 500 at intervals in the circumferential direction and on the inner edge 110 of the fixed disc 100 in the circumferential direction. A depth of each of the weight-reducing inner grooves is 17 mm. In this way, unnecessary materials among the bolts 600 are removed while maintaining an amount of blank compression of the bolts 600, so that the weight is reduced without reducing connection strength.

In addition, eight outer weight-reducing grooves 150 are accurately cut out on the outer edge of the fixed disc 100 at intervals in the circumferential direction. A depth of each of the outer weight-reducing grooves 150 is 17 mm. In this way, unnecessary materials among the mousing hook connecting bolts 811 and the eight lower rotation device connecting bolts 830 are removed while maintaining an amount of blank compression of the mousing hook connecting bolts 811 and the eight lower rotation device connecting bolts 830, so that the weight is reduced without reducing connection strength.

What is claimed is:

1. A rotation device for a vehicle seat, the device comprising: a fixed disc, a lower ball assembly, a movable disc, an upper ball assembly, and a platen successively arranged from bottom to top, the fixed disc being connected to the platen by using a plurality of fastening structures, a first lower circular track being formed on the fixed disc by means of mould pressing, a first upper circular track and a second lower circular track being formed on the movable disc by means of mould pressing, a second upper circular track being formed on the platen by means of mould pressing, the upper ball assembly comprising a plurality of upper balls configured for rolling contact with the second upper circular track and the second lower circular track and an upper holder configured to hold the upper balls between a pressing disc and the movable disc, the lower ball assembly comprising a plurality of lower balls configured for rolling contact with the first upper circular track and the first lower circular track and a low holder configured to hold the lower balls between the movable disc and the fixed disc, an upper mousing hook being fixed to the fixed disc, a lower mousing hook being formed on a periphery of the movable disc, and the upper mousing hook and the lower mousing hook being hooked to each other to avoid disengagement of the movable disc, wherein a diameter of a first arcuate envelope line of the first lower circular track that is in contact with each of the lower balls and a diameter of a second arcuate envelope line of the first upper circular track that is in contact with the lower ball are both equal to a diameter of the lower ball, a height of the first arcuate envelope line and a height of the second arcuate envelope line are both 0.8 times the diameter of the lower ball, a diameter of a third arcuate envelope line of the second lower circular track that is in contact with each of the upper balls and a diameter of a fourth arcuate envelope line of the second upper circular track that is in contact with the upper ball are both equal to a diameter of the upper ball, and a height of the third arcuate envelope line and a height of the fourth arcuate envelope line are both 0.8 times the diameter of the upper ball;

wherein a spacer is disposed between the platen and the fixed disc, the fastening structures pass through the spacer, and a plurality of bosses are uniformly distributed in a circumferential direction on a face of the spacer that is in contact with the platen;

wherein the spacer is composed of at least two arcuate spacers, and in a case that a mounting sequence and a screwing force of the fastening structures are constant, the arcuate spacers are assembled in groups according to a tolerance zone between the platen and the fixed disc, so as to obtain a rotation device having different rotation damping values.

2. The rotation device for a vehicle seat according to claim 1, wherein the diameter of the upper ball and the diameter of the lower ball are both 10 mm.

3. The rotation device for a vehicle seat according to claim 1, wherein the first upper circular track and the second lower circular track are connected in a wave form in a radial direction.

4. The rotation device for a vehicle seat according to claim 3, wherein the diameter of the upper ball is equal to the diameter of the lower ball, and a distance between a circle center-passing plumb line of the upper ball and a circle center-passing plumb line of the lower ball is equal to the diameter of the upper ball or the lower ball.

5. The rotation device for a vehicle seat according to claim 1, wherein the plurality of fastening structures are uniformly distributed in a circumferential direction to fixedly connect an inner edge of the platen to an inner edge of the fixed disc.

6. The rotation device for a vehicle seat according to claim 1, wherein a plurality of lower rotation device connecting bolts are fixed to an outer periphery of the upper mousing hook in a circumferential direction at intervals, a plurality of rotation device connecting bolt passing holes are provided on an outer periphery of the fixed disc at intervals in a circumferential direction, and each of the lower rotation device connecting bolts passes through the corresponding rotation device connecting bolt passing hole to be connected to a vehicle floor or a base.

7. The rotation device for a vehicle seat according to claim 1, wherein a plurality of stepped nuts each having a T-shaped axial cross section are fixed to the movable disc at intervals in a circumferential direction, a nut head of each of the stepped nuts is located under the movable disc and tightly attached to a bottom face of the movable disc, a nut portion of the stepped nut extends upward out of the movable disc, and a bolt on the seat is connected to the nut portion of the corresponding stepped nut, so as to mount and fixedly connect the seat to the movable disc.

8. The rotation device for a vehicle seat according to claim 7, wherein the nut head of the stepped nut is rectangular.

9. The rotation device for a vehicle seat according to claim 8, wherein the nut head of the stepped nut is fixed to the movable disc by means of welding.

10. The rotation device for a vehicle seat according to claim 1, wherein module connecting bolts are fixed to the movable disc at intervals in a circumferential direction, a bolt head of each of the module connecting bolts is located under the movable disc and tightly attached to a bottom face of the movable disc, and a screw portion of the module connecting bolt extends upward out of the movable disc.

11. The rotation device for a vehicle seat according to claim 10, wherein the module connecting bolt is fixedly connected to the movable disc by means of spot welding.

12. The rotation device for a vehicle seat according to claim 1, wherein a plurality of inner weight-reducing grooves are accurately cut out on an inner edge of the platen at intervals in a circumferential direction and on an inner edge of the fixed disc in a circumferential direction, and a plurality of outer weight-reducing grooves are accurately cut out on an outer edge of the fixed disc at intervals in a circumferential direction.

13. The rotation device for a vehicle seat according to claim 12, wherein a depth of each of the inner weight-reducing grooves and a depth of each of the outer weight-reducing grooves are both 17 mm.

14. A rotation device for a vehicle seat, the device comprising: a fixed disc, a lower ball assembly, a movable disc, an upper ball assembly, and a platen successively arranged from bottom to top, the fixed disc being connected to the platen by using a plurality of fastening structures, a first lower circular track being formed on the fixed disc by means of mould pressing, a first upper circular track and a second lower circular track being formed on the movable disc by means of mould pressing, a second upper circular track being formed on the platen by means of mould pressing, the upper ball assembly comprising a plurality of upper balls configured for rolling contact with the second upper circular track and the second lower circular track and an upper holder configured to hold the upper balls between a pressing disc and the movable disc, the lower ball assembly comprising a plurality of lower balls configured for rolling contact with the first upper circular track and the first lower circular track and a low holder configured to hold the lower balls between the movable disc and the fixed disc, an upper mousing hook being fixed to the fixed disc, a lower mousing hook being formed on a periphery of the movable disc, and the upper mousing hook and the lower mousing hook being hooked to each other to avoid disengagement of the movable disc, wherein a diameter of a first arcuate envelope line of the first lower circular track that is in contact with each of the lower balls and a diameter of a second arcuate envelope line of the first upper circular track that is in contact with the lower ball are both equal to a diameter of the lower ball, a height of the first arcuate envelope line and a height of the second arcuate envelope line are both 0.8 times the diameter of the lower ball, a diameter of a third arcuate envelope line of the second lower circular track that is in contact with each of the upper balls and a diameter of a fourth arcuate envelope line of the second upper circular track that is in contact with the upper ball are both equal to a diameter of the upper ball, and a height of the third arcuate envelope line and a height of the fourth arcuate envelope line are both 0.8 times the diameter of the upper ball;

wherein the plurality of fastening structures are uniformly distributed in a circumferential direction to fixedly connect an inner edge of the platen to an inner edge of the fixed disc, wherein each of the fastening structures comprises a through hole formed on the inner edge of the platen, a threaded hole formed on the inner edge of the fixed disc, and a bolt configured to pass through the through hole to be screwed into the threaded hole.

15. The rotation device for a vehicle seat according to claim 14, wherein a spacer is disposed between the platen and the fixed disc, the fastening structures pass through the spacer, and a plurality of bosses are uniformly distributed in a circumferential direction on a face of the spacer that is in contact with the platen.

16. The rotation device for a vehicle seat according to claim 15, wherein a height of each of the bosses is 0.2-0.4 mm.

17. The rotation device for a vehicle seat according to claim 15, wherein the spacer is annular.

18. The rotation device for a vehicle seat according to claim 15, wherein the spacer is composed of at least two arcuate spacers, and in a case that a mounting sequence and a screwing force of the fastening structures are constant, the arcuate spacers are assembled in groups according to a tolerance zone between the platen and the fixed disc, so as to obtain a rotation device having different rotation damping values.

19. The rotation device for a vehicle seat according to claim 15, wherein a thickness of the spacer is 1 mm.

20. A rotation device for a vehicle seat, the device comprising: a fixed disc, a lower ball assembly, a movable disc, an upper ball assembly, and a platen successively arranged from bottom to top, the fixed disc being connected to the platen by using a plurality of fastening structures, a first lower circular track being formed on the fixed disc by means of mould pressing, a first upper circular track and a second lower circular track being formed on the movable disc by means of mould pressing, a second upper circular track being formed on the platen by means of mould pressing, the upper ball assembly comprising a plurality of upper balls configured for rolling contact with the second upper circular track and the second lower circular track and an upper holder configured to hold the upper balls between a pressing disc and the movable disc the lower ball assembly comprising a plurality of lower balls configured for rolling contact with the first upper circular track and the first lower circular track and a low holder configured to hold the lower balls between the movable disc and the fixed disc, an upper mousing hook being fixed to the fixed disc, a lower mousing hook being formed on a periphery of the movable disc, and the upper mousing hook and the lower mousing hook being hooked to each other to avoid disengagement of the movable disc, wherein a diameter of a first arcuate envelope line of the first lower circular track that is in contact with each of the lower balls and a diameter of a second arcuate envelope line of the first upper circular track that is in contact with the lower ball are both equal to a diameter of the lower ball a height of the first arcuate envelope line and a height of the second arcuate envelope line are both 0.8 times the diameter of the lower ball, a diameter of a third arcuate envelope line of the second lower circular track that is in contact with each of the upper balls and a diameter of a fourth arcuate envelope line of the second upper circular track that is in contact with the upper ball are both equal to a diameter of the upper ball, and a height of the third arcuate envelope line and a height of the fourth arcuate envelope line are both 0.8 times the diameter of the upper ball;

wherein a plurality of upper mousing hook connecting bolts are fixed to an outer periphery of the upper mousing hook at intervals in a circumferential direction, a plurality of upper mousing hook connecting bolt passing holes are provided on an outer periphery of the fixed disc at intervals in a circumferential direction, and each of the upper mousing hook connecting bolts passes through the corresponding upper mousing hook connecting bolt passing hole to be screwed into an upper mousing hook connecting nut, so as to tightly connect the upper mousing hook to the fixed disc.

21. The rotation device for a vehicle seat according to claim 20, wherein the upper mousing hook connecting bolt is fixed to the outer periphery of the upper mousing hook by means of spot welding.

\* \* \* \* \*